United States Patent
Vissers et al.

(10) Patent No.: US 9,086,095 B2
(45) Date of Patent: Jul. 21, 2015

(54) FLANGED BEARING RING FOR A MOTOR VEHICLE WHEEL BEARING UNIT

(75) Inventors: Cornelius Petrus Antonius Vissers, Den Dungen (NL); Paolo Re, Nichelino (IT)

(73) Assignee: AKTIEBOLAGET SKF, Gothenburg (SE)

( * ) Notice: Subject to any disclaimer, the term of this patent is extended or adjusted under 35 U.S.C. 154(b) by 516 days.

(21) Appl. No.: 13/087,568

(22) Filed: Apr. 15, 2011

(65) Prior Publication Data

US 2011/0255819 A1 Oct. 20, 2011

(30) Foreign Application Priority Data

Apr. 15, 2010 (IT) .......................... TO2010A000306

(51) Int. Cl.
| | |
|---|---|
| F16C 33/62 | (2006.01) |
| F16C 33/64 | (2006.01) |
| F16C 33/58 | (2006.01) |
| F16C 33/60 | (2006.01) |
| F16C 19/38 | (2006.01) |

(52) U.S. Cl.
CPC .............. *F16C 33/60* (2013.01); *F16C 19/386* (2013.01); *F16C 33/64* (2013.01); *F16C 2326/02* (2013.01)

(58) Field of Classification Search
CPC ............. F16C 2204/20; F16C 2206/02; F16C 2206/40; F16C 2220/02; F16C 2226/76; F16C 33/605
USPC ......... 384/544, 589, 492, 493, 513, 537, 557, 384/585, 515, 539, 555, 561, 571
See application file for complete search history.

(56) References Cited

U.S. PATENT DOCUMENTS

| | | | | |
|---|---|---|---|---|
| 1,652,468 | A * | 12/1927 | Catlin | 384/296 |
| 2,387,182 | A * | 10/1945 | Procter | 384/609 |
| 2,779,641 | A * | 1/1957 | Sutowski | 384/502 |
| 3,317,256 | A * | 5/1967 | Ernest | 384/410 |
| 3,586,357 | A * | 6/1971 | Orain | 403/380 |
| 3,832,024 | A * | 8/1974 | Nishikawa | 384/538 |
| 3,938,864 | A | 2/1976 | Haussels | |
| 4,010,986 | A * | 3/1977 | Otto | 384/478 |
| 4,125,298 | A * | 11/1978 | Heurich et al. | 384/537 |
| 4,213,660 | A * | 7/1980 | Yasui et al. | 384/585 |
| 4,685,611 | A * | 8/1987 | Scobie et al. | 251/306 |
| 4,925,322 | A * | 5/1990 | Hishida | 384/537 |

(Continued)

FOREIGN PATENT DOCUMENTS

| | | |
|---|---|---|
| DE | 19918351 A1 | 10/2000 |
| DE | 10061663 A1 | 6/2002 |

(Continued)

*Primary Examiner* — Marcus Charles
(74) *Attorney, Agent, or Firm* — Bryan Peckjian; SKF USA Inc. Patent Dept.

(57) ABSTRACT

A flanged bearing ring is formed of two different materials joined together as a single piece, specifically a radially inner annular insert and a flanged, radially outer lightweight body formed about the insert. The insert has one or more inner raceways and is formed of a hard material, such as bearing steel. The outer body is made of a lightweight material, such as aluminum alloy, with a higher thermal expansion coefficient higher than that of the hard material from which the inner insert is formed. A radial projection formed on the outer body extends into a radial recess or groove of the insert. The projection and the recess interlock the insert and the outer body so as to prevent relative movement.

13 Claims, 2 Drawing Sheets

(56) References Cited

U.S. PATENT DOCUMENTS

| | | | |
|---|---|---|---|
| 5,066,147 A * | 11/1991 | Brandenstein et al. | 384/585 |
| 5,542,752 A * | 8/1996 | Quaglia | 301/64.702 |
| 6,170,919 B1 * | 1/2001 | Hofmann et al. | 301/105.1 |
| 6,238,096 B1 * | 5/2001 | Allen et al. | 384/495 |
| 6,485,188 B1 * | 11/2002 | Dougherty | 384/589 |
| 6,505,973 B2 * | 1/2003 | Buchheim et al. | 384/537 |
| 6,626,579 B1 * | 9/2003 | Silvasi | 384/476 |
| 6,715,925 B2 * | 4/2004 | Pairone et al. | 384/536 |
| 6,866,422 B2 * | 3/2005 | Griseri et al. | 384/537 |
| 6,935,026 B2 * | 8/2005 | Frantzen | 409/287 |
| 7,654,745 B2 * | 2/2010 | Maloney | 384/439 |
| 2007/0098315 A1 * | 5/2007 | Komori et al. | 384/544 |

FOREIGN PATENT DOCUMENTS

| | | |
|---|---|---|
| EP | 1046828 A2 | 10/2000 |
| EP | 1830097 A1 | 9/2007 |
| GB | 1510546 A | 5/1978 |
| WO | WO2008147284 A1 | 12/2008 |
| WO | WO 2009077259 A1 * | 6/2009 |
| WO | WO2010012283 A1 | 2/2010 |
| WO | WO2010012284 A1 | 2/2010 |

* cited by examiner

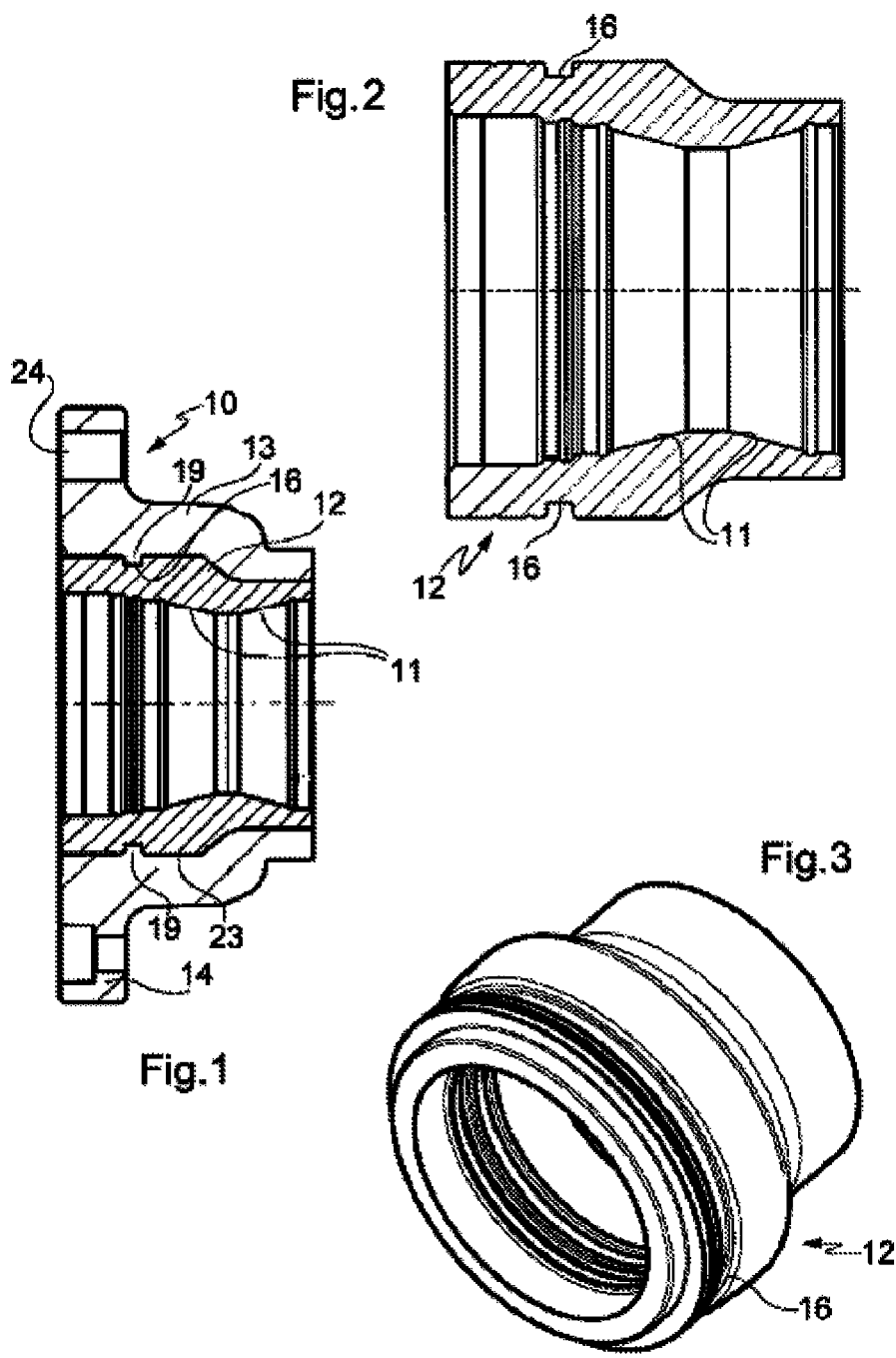

FLANGED BEARING RING FOR A MOTOR VEHICLE WHEEL BEARING UNIT

CROSS-REFERENCE

This application claims priority to Italian Patent Application No. TO2010A000306 filed on Apr. 15, 2010, the contents of which are incorporated fully herein by reference.

BACKGROUND OF THE INVENTION

The present invention relates to bearings, and more particularly to lightweight, flanged bearing rings for the hub of a motor vehicle wheel.

The bearing ring of wheel hub bearings may either be a stationary ring with a flange for mounting the relevant hub-bearing unit to the suspension standard of a motor vehicle, or a rotatable ring where the flange provides connection to the wheel and/or the brake rotor.

There is an ever increasing demand for weight reduction in motor vehicle components for the sake of cutting down fuel consumption and exhaust emissions. With a vehicle wheel bearing, weight reduction must not result in a reduction in strength and/or safety. The raceways must be made of a material having hardness sufficient to resist the stresses of rolling contact. Conventional bearing steel is still widely used, although other materials have been proposed, such as ceramics and titanium, which provide good mechanical performance but are considerably more expensive as compared to bearing steel.

WO 2008/147284 A1 discloses a bearing ring made up of two different materials joined together in a single piece, namely a first, high toughness material such as bearing steel forming the raceways and a second, lightweight material, such as a lightweight metal, forming the rest of the ring. The second material is joined to the first material by a semi-solid casting process.

SUMMARY OF THE INVENTION

It is an object of the present invention to improve the connection between the two different portions of a flanged bearing ring made of two different materials, namely a first, hard material and a second, lightweight material. Particularly, it is desired to improve such a connection at least at high working temperatures.

The present invention is directed to a flanged bearing ring for a motor vehicle wheel that provides improvements in the key areas of bearing ring performance. That is, the bearing ring of the invention provides a lower weight, while ensuring the required high strength capabilities. The ring is made up of two different materials joined together as a single piece, and includes a radially inner, annular or tubular insert, and a radially outer body formed around the insert. The insert forms one or more raceways and is made of a hard material with a first thermal expansion coefficient. The outer body provides a radially outwardly extending flange and is made of a lightweight material with a second thermal expansion coefficient higher than that of the first material. Interlocking means, formed by the insert and the outer body, lock these two bodies together against relative axial movement. The interlocking means include one or more radially recessed portions at an outer surface of the insert. Respective, complementary radially protruding portions are formed by the outer body, thereby preventing axial movement between the outer body and the inner insert at least at high working temperatures. Preferably, these mating protrusions and recesses at the interface between the outer body and the inner insert are so shaped as also prevent relative rotary movement between the outer body and the inner insert.

Other features and advantages of the invention will become apparent to those skilled in the art upon review of the following detailed description, claims and drawings in which like numerals are used to designate like features.

BRIEF DESCRIPTION OF THE DRAWINGS

In order that the present invention may be well understood there will now be described a few preferred embodiments thereof, given by way of example, reference being made to the accompanying drawings, in which:

FIG. 1 is an axial cross-sectional view of a first embodiment of a bearing ring according to the invention;

FIG. 2 is an axial cross-sectional view of an annular insert of the bearing ring of FIG. 1;

FIG. 3 is a perspective view of the insert of FIG. 2;

DETAILED DESCRIPTION OF THE INVENTION

Figure 4:
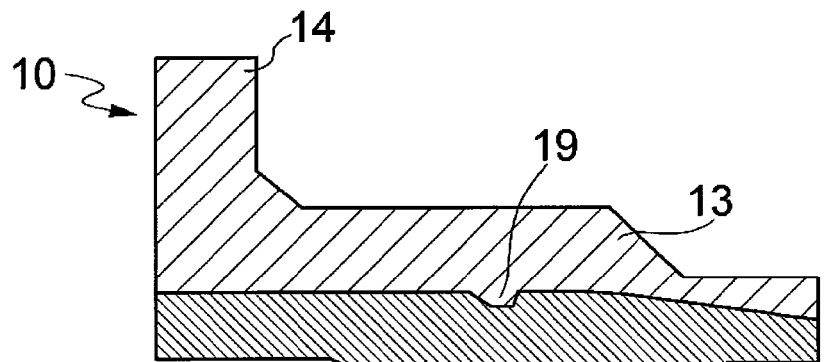
FIGS. 4-6 are partial, axial cross-sectional views of bearing rings made in accordance with other different embodiments of the invention.

Referring first to FIGS. 1 to 3, a flanged bearing ring 10 in accordance with a first embodiment of the invention is depicted. The ring 10 in this example is a bearing ring for vehicle applications, particularly for rotatably mounting a wheel (not shown) to a conventional stationary suspension (not shown) of the vehicle. The bearing ring 10 preferably has two raceways 11 for two rows of rolling elements, in this example tapered rollers.

The ring 10 comprises a radially inner insert 12 of generally annular or tubular shape and a radially outer body 13 providing a radially outwardly extending flange 14 near an outboard end of the insert 12. The flange 14 provides a number of through bores 24 to allow connection to the suspension standard by means of stud bolts. Although the bearing ring 10 shown in FIG. 1 is a radially outer bearing ring, the ring structure described below may also be used with other types of flanged bearing rings, for example a rotatable, radially inner (or outer) bearing ring the radial flange of which is to be fixed to the wheel. Throughout the present description and the claims, terms and expressions indicating positions and directions such as "radial" and "axial" are understood as referring to the axis of rotation x of the bearing. Expressions such as "inboard" and "outboard" instead refer a condition when mounted on a vehicle.

Preferably, the radially inner insert 12 is formed of a first, relatively hard material having a first, lesser volumetric thermal expansion coefficient and the radially outer body 13 is formed of a second, "lightweight" (i.e., relatively low density) material with a second, volumetric thermal expansion coefficient higher than that of the first material. Since the insert 12 provides one or more raceways 11, a hard and tough material suitable for the insert 12 is, for example, a bearing grade steel. As alternatives, low carbon steel or a ceramic may be used. As a lightweight material for the outer body 13, a lightweight or low density metal is preferred, such as aluminium, magnesium, or alloys thereof. Other suitable materials for the outer body 13 may include, but not be limited to, carbon composites or reinforced polymers.

The insert 12 is machined so as to form, in its radially outer surface 23, at least one radially recessed, circumferentially extending annular "groove" or recess 16. The recess 16 is defined by a central circumferential portion of lesser diameter than the remainder of the outer surface 23 and a pair of facing, generally radial surfaces extending between each edge of the central portion and the outer surface 23. In a preferred embodiment, the insert 12 has a single recess 16 extending circumferentially and continuously about the outer surface 23 of the insert 12, but may alternatively have a plurality of circumferentially spaced, generally arcuate recesses 16. As better explained in the following, the recess 16 provides part of an interlocking means for preventing relative axial movement between the insert 12 and the outer body 13. To some extent, depending on the cross-sectional shape of the recess 16, these interlocking means will also prevent radial movement between the insert 12 and the outer body 13, when one or more undercuts 20 are provided, as in the embodiments of FIGS. 3 and 5.

Preferably, the outer body 13 is formed and joined to the insert 12 by means of a semi-solid casting process, which is a near net shape process wherein the metal of the outer body 13 is formed at a temperature between liquid and solid states. The advantage of a semi-solid casting process as opposed to a molten metal process, such as high pressure die casting, is that the outer body 13 obtains a denser, dendrite-free microstructure providing the strength and crack-propagation resistance required for bearing applications. Also, the semi-solid casting process allows the outer body 13 to more readily achieve a desired final shape in applications where the surfaces at the interface between the insert 12 and the outer body 13 have a particularly complex shape, for example if undercuts are provided.

The wheel-mounting flange 14 can be formed with the necessary geometry to ensure sufficient stiffness. Moreover, the bores 24 in the wheel mounting flange 14 can be provided during the semi-solid casting process, by forming the semi-solid metal of the flange 14 around appropriately positioned threaded nuts or stud bolts.

A rheocasting process is one example of a preferred semi-solid casting process. Using aluminium as an example of the lightweight metal for the outer body 13, a rheocasting process initially involves bringing the aluminium to a molten (liquid) state. The molten aluminium is then allowed to cool and is stirred during solidification to obtain a semi-solid slurry. The step of cooling can involve adding solid particles of aluminium to the molten material and, for enhanced efficiency, the solid particles can be added via a stirring mechanism. An exchange of enthalpy takes place between the liquid aluminium and the solid particles, which facilitates the formation of the slurry and can dispense from the need for external cooling. The semi-solid aluminium slurry is then injection-moulded to the inner insert 12 with the aid of a suitable die that defines the required shape of the wheel mounting flange 14.

While it is preferred, as already indicated, to form the outer body 13 by a semi-solid casting process, in its broadest aspect the invention is not so limited and encompasses the possibility of sintering or casting, die-casting or otherwise forming the outer body about the inner insert 12.

As the second material of the outer body 13 cools and solidifies, the body 13 shrinks. Basically, contraction occurs in a radially inward direction, towards the central axis of rotation x of the bearing unit. Thus, the semi-solid metal of the outer body 13 shrinks into the recess 16 of the insert 12 and forms a projection 19 tightly copying or following the shape of recess 16, so as to interlock, and substantially prevent relative axial movement between, the outer body 13 and the insert 12. Even at high working temperatures, relative movement between the outer body 13 and the insert 12 is substantially prevented by the interlocking means 16, 19. The nearness of the brakes to a typical wheel bearing hub creates harsh operating conditions, which generally results in considerable dimensional changes due to temperature. In such an occurrence, the outer body 13 will expand more that the insert 12 and will tend to separate therefrom. However, the projection or tongue 19 will expand more than the recess 16 within which it is seated, thereby substantially preventing any axial play between the outer body 13 and the insert 12.

Figure 6:
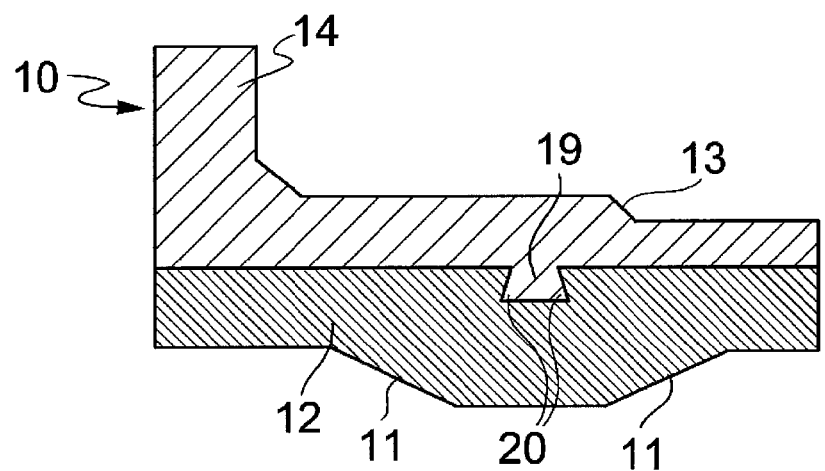

The interlocking means 16, 19 may be formed in a variety of different structures. In a less preferred embodiment (not shown), the recess 16 (and projection 19) may have a generally rectangular cross-sectional shape as taken in an axial plane. Referring to FIGS. 4 and 6, in some preferred embodiments, the recess 16 forms an undercut 20 engageable with a complementary shape of the projection 19, so as to provide a higher degree of interlock against relative radial movement between the outer body 13 and the inner insert 12, i.e., in a direction perpendicular to the axis of rotation x.

A variety of different designs of wheel bearing units may be produced utilizing the bearing ring 10 of the present invention. For example, the bore of the insert 12 can serve as an outer raceway for rolling elements of a constant velocity joint and the bearing unit can further comprise an integral CV joint. Moreover, the bearing unit can be a single row or a double-row angular contact bearing in which the rolling elements are balls, rollers, flattened balls etc. Also, when the unit is a double-row bearing, the raceways 11 for the first and second rows of rolling elements can be equal in diameter, or the diameter can differ.

Figure 5:
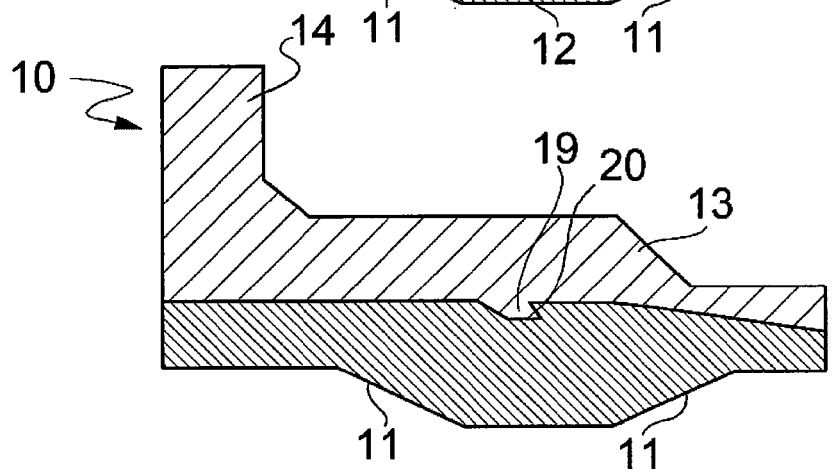

Further embodiments are schematically depicted in FIGS. 4 to 6. FIG. 4 shows an example of a recess 16 having two opposite conical surfaces at an obtuse angle, i.e. tapering towards each other. In the embodiment of FIG. 5, the recess 16 has two conical surfaces tapering in a same direction. The two conical surfaces are almost parallel or at an acute angle and one of them forms an undercut 20. In the embodiment of FIG. 6, the recess 16 has two conical surfaces tapering in opposite directions, providing two undercuts 20, such that the recess 16 and the projection 19 are each generally shaped so as to form a dovetail joint.

While a few illustrative embodiments have been disclosed in the foregoing summary and detailed description, it should be appreciated that a vast number of variations exist. It should also be appreciated that the illustrative embodiments are only examples, and are not intended to limit the scope, applicability, or configuration in any way. Rather, the foregoing summary and detailed description will provide those skilled in the art with a convenient road map for implementing the invention, it being understood that various changes may be made in the function and arrangement of elements described in the exemplary embodiments without departing from the scope as set forth in the appended claims and their legal equivalents.

We claim:

1. A flanged bearing ring for a motor vehicle wheel, the ring comprising:
   a radially inner, generally annular insert formed of a first material with a first thermal expansion coefficient, the insert having a central axis, at least one raceway extending about the axis, a radially outer surface, and at least one recess extending generally radially inwardly from the outer surface; and
   a radially outer body formed of a second material with a second thermal expansion coefficient, the second coefficient being greater than the first coefficient, the outer body being disposed about the insert and having a radially outwardly extending flange and at least one radially inwardly extending projection disposed within the recess of the insert so as to interlock and prevent relative axial and radial displacement between the insert and the outer body,
wherein the at least one recess of the insert increases in axial dimension as proceeding radially inward, such that the at least one recess has an undercut engageable with the at least one projection of the outer body.

2. The bearing ring according to claim 1 wherein the first material has a first density and the second material has a second density, the second density being lesser than the first density.

3. A bearing ring according to claim 1, wherein the at least one recess of the insert and the at least one projection of the outer body are each generally shaped so as to form a dovetail joint.

4. The bearing ring according to claim 1, wherein the at least one recess of the insert extends circumferentially and substantially continuously about the outer surface of the insert.

5. The bearing ring according to claim 1, wherein the first material is one of bearing grade steel, a low-carbon steel and a ceramic material.

6. The bearing ring according to claim 1, wherein the second material includes a relatively low density metal.

7. The bearing ring according to claim 6, wherein the low density metal is one of aluminium, magnesium, an aluminium alloy and a magnesium alloy.

8. The bearing ring according to claim 6, wherein the outer body is formed from the relatively low density metal and is joined to the insert by a semi-solid casting process.

9. The bearing ring according to claim 8, wherein the semi-solid casting process is one of a thixoforming process, a thixocasting process, a thixoforging process, a thixojoining process, a rheoforming process, a rheocasting process, a rheoforging process, and a rheojoining process.

10. The bearing ring according to claim 1, wherein the at least one radial recess of the insert and the at least one radial projection of the outer body each extends circumferentially and substantially continuously about the central axis, the at least one radial recess being complementary to the at least one radial projection.

11. The bearing ring according to claim 1, wherein the at least one raceway is configured to engage at least one row of rolling elements.

12. The bearing ring according to claim 11, wherein the at least one raceway is tapered.

13. The bearing ring according to claim 1, wherein the at least one raceway comprises a first raceway and a second raceway that are spaced axially apart, and wherein the first raceway is positioned axially between the at least one recess and the second raceway.

* * * * *